United States Patent
Batra

(10) Patent No.: US 10,715,595 B2
(45) Date of Patent: Jul. 14, 2020

(54) REMOTES METADATA EXTRACTION AND TRANSCODING OF FILES TO BE STORED ON A NETWORK ATTACHED STORAGE (NAS)

(71) Applicant: Western Digital Technologies, Inc., Irvine, CA (US)

(72) Inventor: Rajesh K. Batra, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 801 days.

(21) Appl. No.: 14/582,043

(22) Filed: Dec. 23, 2014

(65) Prior Publication Data

US 2016/0179826 A1  Jun. 23, 2016

(51) Int. Cl.
*G06F 15/16* (2006.01)
*H04L 29/08* (2006.01)
*G06F 16/27* (2019.01)

(52) U.S. Cl.
CPC .......... *H04L 67/1097* (2013.01); *G06F 16/27* (2019.01); *H04L 67/10* (2013.01)

(58) Field of Classification Search
CPC ................ H04L 67/1097; H04L 67/10; G06F 17/30283; G06F 16/27
See application file for complete search history.

(56) References Cited

U.S. PATENT DOCUMENTS

| | | |
|---|---|---|
| 6,407,680 B1 | 6/2002 | Lai et al. |
| 6,499,054 B1 | 12/2002 | Hesselink et al. |
| 6,732,158 B1 | 5/2004 | Hesselink et al. |
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,676,590 B2 | 3/2010 | Silverman et al. |
| 7,788,404 B2 | 8/2010 | Hesselink et al. |

(Continued)

OTHER PUBLICATIONS

International Search Report and Written Opinion dated Mar. 31, 2016 in related International Application PCT/US2015/066436.

(Continued)

*Primary Examiner* — Chirag R Patel
*Assistant Examiner* — Rachel J Hackenberg
(74) *Attorney, Agent, or Firm* — Chang & Hale LLP

(57) ABSTRACT

A method may comprise monitoring files (files, folders, documents of any type) to be sent to a remote storage to identify those that belong to selected file types and extracting metadata from those that belong to the selected file type(s), which may then be transcoded. Identifiers of the transcoded files and corresponding extracted metadata may be sent to a storage database. The transcoded files may be sent to be stored in the remote storage such that, upon receiving a file request and at least one criterion, the remote storage searches the database to find identifier(s) of the transcoded file(s) whose extracted metadata satisfies the criterion. Responsive to the received file request, one or more transcoded files may be made available whose identifier(s) were found during the search of the database. Alternatively or in addition, links to the transcoded files that correspond to found identifier(s) may be made available.

24 Claims, 4 Drawing Sheets

(56) References Cited

U.S. PATENT DOCUMENTS

| | | | |
|---|---|---|---|
| 7,917,628 | B2 | 3/2011 | Hesselink et al. |
| 7,934,251 | B2 | 4/2011 | Hesselink et al. |
| 7,949,564 | B1 | 5/2011 | Hughes et al. |
| 8,004,791 | B2 | 8/2011 | Szeremeta et al. |
| 8,145,779 | B2 | 3/2012 | Zhang |
| 8,220,027 | B1 | 7/2012 | Dagman et al. |
| 8,255,661 | B2 | 8/2012 | Karr et al. |
| 8,285,965 | B2 | 10/2012 | Karr et al. |
| 8,341,117 | B2 | 12/2012 | Ram et al. |
| 8,341,275 | B1 | 12/2012 | Hesselink et al. |
| 8,352,567 | B2 | 1/2013 | Hesselink et al. |
| 8,526,798 | B2 | 9/2013 | Hesselink |
| 8,631,284 | B2 | 1/2014 | Stevens |
| 8,646,054 | B1 | 2/2014 | Karr et al. |
| 8,661,507 | B1 | 2/2014 | Hesselink et al. |
| 8,688,797 | B2 | 4/2014 | Hesselink et al. |
| 8,713,265 | B1 | 4/2014 | Rutledge |
| 8,762,682 | B1 | 6/2014 | Stevens |
| 8,780,004 | B1 | 7/2014 | Chin |
| 8,793,374 | B2 | 7/2014 | Hesselink et al. |
| 8,819,443 | B2 | 8/2014 | Lin |
| 9,122,635 | B1* | 9/2015 | Zhang ................... G06F 17/00 |
| 9,280,683 | B1* | 3/2016 | Echeverria ........ G06F 17/30094 |
| 9,405,928 | B2* | 8/2016 | Amarendran ....... G06F 21/6218 |
| 9,626,363 | B2* | 4/2017 | Rosenblatt ........ G06F 17/30017 |
| 2004/0213273 | A1 | 10/2004 | Ma |
| 2005/0144195 | A1 | 6/2005 | Hesselink et al. |
| 2005/0144200 | A1 | 6/2005 | Hesselink et al. |
| 2006/0112188 | A1 | 5/2006 | Albanese et al. |
| 2006/0253894 | A1 | 11/2006 | Bookman et al. |
| 2007/0162487 | A1 | 7/2007 | Frailey |
| 2008/0065691 | A1 | 3/2008 | Suitts et al. |
| 2008/0140719 | A1* | 6/2008 | Chaney ............. G06F 17/30053 |
| 2008/0181578 | A1 | 7/2008 | Hanes |
| 2009/0043828 | A1* | 2/2009 | Shitomi ............ G06F 17/30221 |
| 2009/0119322 | A1 | 5/2009 | Mills et al. |
| 2009/0150409 | A1 | 6/2009 | Watson et al. |
| 2009/0254672 | A1 | 10/2009 | Zhang |
| 2009/0286560 | A1 | 11/2009 | Willis |
| 2010/0011014 | A1 | 1/2010 | Odulinski et al. |
| 2010/0094931 | A1 | 4/2010 | Hosur et al. |
| 2012/0036041 | A1 | 2/2012 | Hesselink |
| 2012/0191876 | A1 | 7/2012 | Johnson et al. |
| 2013/0212401 | A1 | 8/2013 | Lin |
| 2013/0266137 | A1 | 10/2013 | Blankenbeckler et al. |
| 2013/0268749 | A1 | 10/2013 | Blankenbeckler et al. |
| 2013/0268759 | A1 | 10/2013 | Blankenbeckler et al. |
| 2013/0268771 | A1 | 10/2013 | Blankenbeckler et al. |
| 2014/0095439 | A1 | 4/2014 | Ram |
| 2014/0169921 | A1 | 6/2014 | Carey |
| 2014/0173215 | A1 | 6/2014 | Lin et al. |
| 2014/0280010 | A1 | 9/2014 | Ravipati et al. |
| 2014/0331335 | A1* | 11/2014 | Deschenes ......... G06K 17/0016 726/28 |
| 2015/0248253 | A1* | 9/2015 | Kim ...................... G06F 3/0611 707/723 |
| 2016/0212482 | A1* | 7/2016 | Balko .............. H04N 21/44021 |

OTHER PUBLICATIONS

Rajesh K. Batra, U.S. Appl. No. 12/847,096, filed Jul. 30, 2010, 31 pages.

* cited by examiner

REMOTES METADATA EXTRACTION AND TRANSCODING OF FILES TO BE STORED ON A NETWORK ATTACHED STORAGE (NAS)

BACKGROUND

Network-attached storage (NAS) is the common name for a category of file-level computer data storage that is configured to be connected to a computer network and to provide data access to a heterogeneous group of clients. A NAS not only operates as a file server, but is specialized for this task either by its hardware, software, or configuration of those elements. NAS devices are often manufactured as specialized computers built from the ground up for storing and providing access to files.

NAS devices are networked appliances that may contain one or more hard drives, which are often arranged into logical, redundant storage containers or RAID. Network-attached storage removes the responsibility of file serving from other servers on the network. Of late, NAS devices have emerged as a popular and convenient way to share files among multiple computers. Compared to file servers, NAS device offer faster data access, easier administration, and simple configuration. They typically provide access to files using network file sharing protocols such as NFS, SMB/CIFS, or AFP. Typically, however, NAS devices are specialized devices that are configured to store, serve and manage files. While the processors of NAS devices have more than adequate processing power to administer a file system, they may not be as computationally capable for other tasks as the processors of the client devices accessing them.

DETAILED DESCRIPTION

Figure 1:
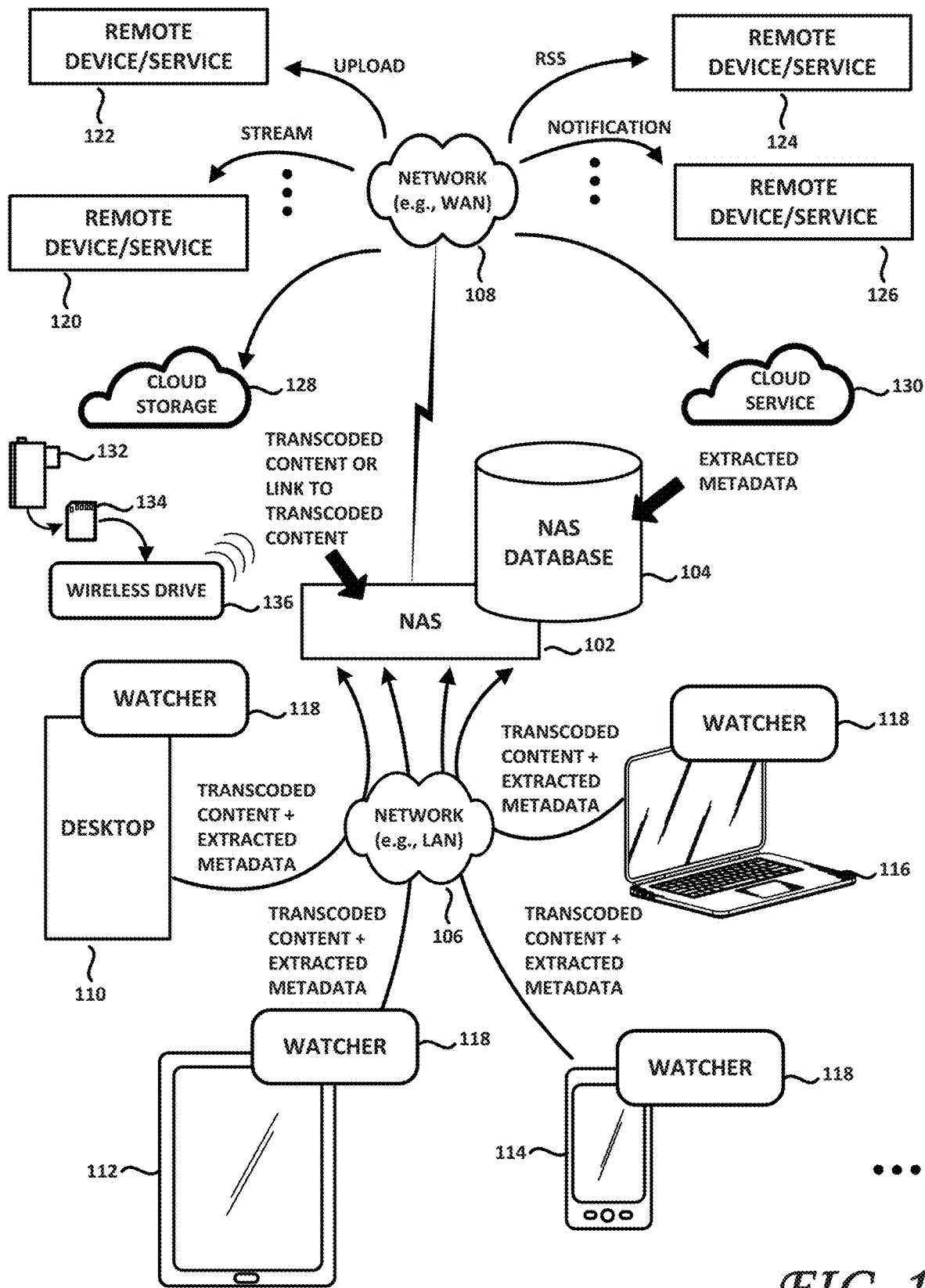
FIG. 1 is a block diagram of a device, systems and method according to one embodiment.

FIG. 1 is a block diagram of a device, systems and method according to one embodiment. As shown therein, a NAS 102 may be coupled to a network (such as a Local Area Network (LAN)) 105 and to a network (e.g., a Wide Area Network (WAN) such as the Internet) 108. The NAS 102 may be configured to communicate with a number of client computing devices, such as shown at 110, 112, 114 and 116. Such client computing devices 110, 112, 114 and 116, may be configured, for example, as desktop computers, tablets, mobile devices or laptops, to name but a few possibilities. Another example of a client computing device may include, for example, a set-top-box for a home theater system. A database 104 may be stored in or otherwise coupled or accessible to the NAS 102. The NAS 102 may also be configured to communicate with remote services and devices, such as shown at 120, 122, 124 and 126. The NAS 102 may also be configured to communicate with so-called cloud storage services 128 and/or other cloud services 130. In this disclosure, the term "cloud" encompasses at least computing in which large groups of remote servers are networked to allow the centralized data storage, and online access to computer services or resources.

Many NASs, such as shown at 102 in FIG. 1, are used to store media content (such as Audio-Visual (AV) content, for example) that may have been generated by (or received by) client computing devices 110, 112, 114 and 116. Indeed, many such client computing devices may be configured to download media content and/or may be configured to create such media content. For example, many client computing devices 110, 112, 114 and 116 include high quality still and video cameras that generate AV files that may be very large in size (i.e., hundreds of MBs or several GBs). However, such media content is not always created or captured by the client computing devices themselves but may, instead, have been created by another party and downloaded, streamed or otherwise accessed by the client computing devices 110, 112, 114 and 116. Therefore, a large number of large-size files (including, for example, audio content, video content, still images, documents and the like) may be stored by NAS 102. The owner of the NAS 102, moreover, may wish to share his or her stored media content, to enable others, such as family members, friends and colleagues, to enjoy the created and stored content. However, the sharing (via streaming, push, download, etc.) of such large files may be problematic, especially if the network does not provide for sufficient bandwidth for such transfer of media content to be made quickly and efficiently. If the process of sharing of media content takes too long (an individual and subjective determination, to be sure), the intended recipient may simply abort the process and forego the opportunity to enjoy the media content to be shared.

According to one embodiment, a file watcher functionality may be installed and configured to run on the computing devices 110, 112, 114 and 116. This file watcher functionality (hereafter referred to as the "watcher 118") may be configured as a computer program installed and configured to run on the client computing device. In certain devices and platforms, a watcher 118 may not be allowed to be installed and run. In those cases, a static or dynamic library may be provided that may be called to carry out the notification and transcoding functionalities, as well as the database indexing and metadata extraction duties. Some or all of the functionality of the watcher 118 may be carried out in hardware. For example, some or all of the functionality of the watcher 118 may be implemented as a Floating Programmable Gate Array (FPGA) programmed to implement the methods and functionality disclosed in this disclosure via, for example, a hardware descriptor language such as Verilog or VHSIC Hardware Descriptor Language (VHDL).

According to one embodiment, the file watcher 118 may be configured to monitor transfers of files from the client computing device in which it resides (one such client watcher 118 per client computing device in one implementation). Indeed, the file watcher 118 may monitor the files to be transferred to the NAS 102 to identify files that belong to one or more selected file types. For example, the monitored file types may be those file types that are characteristically indicative of media or other rich content. For example, the monitored media types may include .RAW or .JPG files for still photos or images, .MOV, .AVI or MPEG for video, WAV or MP3 for audio files (e.g., music). Files of any type may be monitored in this manner. There are many file types and any subset of these may be used by the watcher 118 as the basis of its monitoring. A suitable user interface may enable the user to decide which file types are to be monitored and/or the watcher 118 itself may be pre-seeded with a suitable set of file types, without any input from or intervention by the user.

The watcher 118, according to one embodiment, may be configured to extract metadata from the monitored original files ("original" in the sense of a first set of not yet transcoded and/or otherwise acted upon files) presented to the watcher 118 that belong to the selected file type(s). As is made clear below, the phrase "original files" is used to distinguish such files from the transcoded versions thereof, as detailed below. Broadly, "metadata" refers to information about information and is often used to describe, provide additional information about or otherwise characterize the media content. Such metadata may be extracted from the original files of the selected file types. For example, if the watcher 118 is configured to monitor .MOV and .JPG files, the metadata thereof may be extracted by the watcher 118, while the metadata of files of a type other than the selected file type or types may not be extracted. Therefore, if a computing device 110 transfers some Microsoft Word Files, an Adobe PDF file, a movie of the .MOV type and several .JPG photos, the metadata of only the movie and photo files may be extracted by the watcher 118, while the metadata of the original files of the non-selected file types may not be extracted. According to one embodiment, different metadata may be extracted from different file types. For example, in Word and PDF files, the full text of the files may be extracted, to thereby enable Full Text Searching. The original file or files of the non-selected type or types may simply be forwarded to the NAS in the usual course, with the watcher 118 acting as a pass-through layer.

According to embodiments, the extracted metadata may take most any form and may provide information as to when, where, why, and how the content was created. For example, for audio and video content, the metadata may be linked to the media content and identify the media including, for example, the clip or playlist names, duration, time code and the like. This metadata may also describe the content of the file such as, for example, the quality of video content, rating or description. The metadata of video content may also classify the media, in that the metadata may include information enabling the media to be readily sorted or found. The extracted metadata may describe some geospatial characteristic of the content. Indeed, geospatial metadata may identify map locations or features such as Global Positioning Satellite (GPS) coordinates, Point of Interest (POI) or other tagged information, either by the computing device 110, 112, 114, 116 and/or manually by the user thereof. Such tagged information may include names of people appearing in the photo or video, either inputted manually or through face recognition software, for example. Additional metadata may be obtained through accessing the user's social media, for example. Metadata is very useful in describing digital audio files. For example, metadata of audio files may be configured to name, describe, catalogue and indicate ownership or copyright for a digital audio file. Most digital audio formats, including mp3, broadcast way and AIFF files, store such metadata in standardized locations, which facilitates the extraction thereof. For example, music recordings often include a layer of metadata identifying such information as dates, artist, genre, copyright owner and the like. Metadata for compressed and uncompressed digital music is often encoded in and may readily be extracted from, an ID3 tag.

According to one embodiment, the monitored original files that belong to the selected file type(s) may be transcoded (e.g., converted or otherwise changed) to generate transcoded files. In the case in which the monitored file and/or folder is a document or contains one or more documents, the transcoding process may comprise, for example, generating a thumbnail image of the file, folder, document or other logical construct. In this disclosure, transcoding may include any digital-to-digital conversion of one encoding format to another format. Transcoding of a document may also comprise extracting textual information from the file, which enables later searching using Full Text Searching (FTS). The extracted textual information may be stored in the remote database 104, along with identifiers and extracted metadata. The transcoding may, for example, reduce the size of the media file and/or change the format thereof. This may be done, for example, to support playback on a target client computing device 110, 112, 114 and 116 and/or to facilitate an efficient transfer thereof over the network 106 and/or 108. For example, the transcoding may include, for uncompressed FLAG or WAV audio files, include a reduction in the size of the file and conversion to another format such as MP3, for example. The transcoding may be a lossless process or may be a lossy process, such as occurs during conversion to the MP3 or other compressed formats such as JPG. For example, a 36 MB WAV file encoded at 1411 Kbps may be transcoded into a 320 Kbps file of only about 8 MB without, for all but discerning audiophiles, any significant degradation in perceived audio quality. Such 8 MB file may be more easily transferred over the networks 106, 108 and consumed by other client computing devices and/or remote devices or services than could the 36 MB original file. Similar transcoding may be carried out with other file types.

As shown in FIG. 1, the extracted metadata of the transcoded files may be sent to and stored within the NAS database 104. Along with the extracted metadata, identifiers of the original (or transcoded) files from which the metadata was extracted may also be sent to and stored within the NAS database 104. For example, the database may store a plurality of records, each comprising fields for at least the file identifier (e.g., a file name) and the extracted metadata, thereby associating the extracted metadata with a particular file.

According to one embodiment, the transcoded files may be sent from the client computing device that created them to the NAS 102 and stored therein. The metadata, also extracted by the client computing device according to one embodiment, may also be sent to the NAS 102, to be stored within NAS database 104, at least in association with an identifier of the file. In this manner, upon the remote storage (in this example, the NAS 102) receiving a file request and one or more criterion, the remote storage may search the storage database (the NAS database 104 in this example) to find one or more identifiers of one or more transcoded files whose extracted metadata satisfies the provided criterion or criteria. Thereafter, the NAS 102, responsive to the received file request, may be configured to make available, over a computer network such as 106 or 108, one or more transcoded files whose identifier(s) were found during the search of the storage database 104. In addition to the transcoded files, the original files (i.e., not transcoded and in their original format and size) may be stored in the NAS 104 as well. In this manner, the NAS 102 may store the original version of the file as well as the transcoded version or versions thereof. Files that are not of the selected file type(s) may simply be stored in the NAS 102 without change, in their native size and format. According to one embodiment, such monitoring, extraction and storing in the NAS 102 and the NAS database 104 may be carried out without user input or involvement and in a manner that may be entirely transparent to the user.

The transcoded file or files whose identifiers were found during the search of the storage database 104 may be, as noted above, made available to the computing device having issued the original file request. This may be carried out by streaming the file to the file request issuing computing device, by allowing a download thereof or pushing the file to a stated destination on the network 106 or 108. For example, the NAS 102 may stream a file whose identifier was found as a result of the search to a remote device or service 120 having issued the file request that initiated the search. Any method of enabling the file request issuing computing device to render or access the found transcoded file may be used. For example, a publish-subscribe model may be implemented to notify and allow access to the found transcoded files to interested computing devices having previously subscribed to receive such files. For example, grandpa and grandma may have previously subscribed to receive movies of grandchildren on their mobile devices. In this case, "grandchildren" and "movie" may be the criteria used to search the NAS database 104 for extracted metadata that matches or otherwise satisfies the "grandchildren" and the "movie" criteria. The file identifier(s) of files whose extracted metadata matches the "grandchildren" and the "movie" criteria may be used to identify the or those transcoded file or files stored in the NAS 102 to be made available (sent, in this case) to grandma and grandpa's mobile device 122. The creator of the original content, from his or her point of view, merely created the media content and caused it to be stored in the NAS 102, either manually or programmatically. According to one embodiment, the monitoring, metadata extraction and sending of transcoded file and extracted metadata to the NAS 102 and to the NAS database 104, respectfully, may be carried out without any input or intervention (or event conscious acknowledgement) from the user. According to one embodiment, the original file, folder, document or other logical construct may also be sent to the NAS 102.

According to one embodiment, rather than sending, streaming or otherwise making available the transcoded files/folders from the NAS 102 to the file requesting device or devices 120, 122, 124, 126 on the WAN 108 (and/or client computing devices 110, 112, 114 116 on the LAN 106), links corresponding to the found transcoded files may be generated, by the NAS 102. The links may point to a location within the NAS 102 where such transcoded files may be found. Thereafter, upon receiving a file request and one or more criterion, the remote storage (NAS 102, in this illustrative example) may be configured to search the storage database 104 to find identifiers of transcoded files whose extracted metadata satisfies the criterion or criteria in the received file request. Responsive to the received file request, the NAS 102 may be configured to make available, over the computer network 106 or 108, the generated link(s) to the transcoded file(s) corresponding to the found identifier(s). This embodiment may reduce the computational load on the NAS 102, by only sending a link to transcoded files/folders to the ultimate consumer thereof; namely, the computing devices 120, 122, 124, 126 and 130 or indeed the client computing devices 110, 112, 114, 116. Thereafter, the intended consumers of the transcoded files may access the transcoded files through the provided link, whereupon the file may be sent, streamed or otherwise provided to the requesting computing device to enable the local rendering thereof.

The criterion or criteria provided along with the file request (or indeed independently of a contemporaneous file request) may be as basic or complex as desired. For example, a suitable criterion may include "Lake Tahoe, summer 2013". Thereafter, the extracted metadata stored in the NAS database 104 may be searched to find file identifiers whose corresponding metadata matches or otherwise satisfies the provided criteria. The criteria may be more specific, such as "Lake Tahoe, video, July 2013, Robbie and Cheng, Black Bear Restaurant". Such criteria may then be matched against the stored extracted metadata and matching transcoded media files may be identified and provided. If no files exactly match the provided criteria, a "best guess" may be provided (perhaps matching 3 of the 5 provided criteria) and the corresponding transcoded file or files may be provided.

Figure 2:
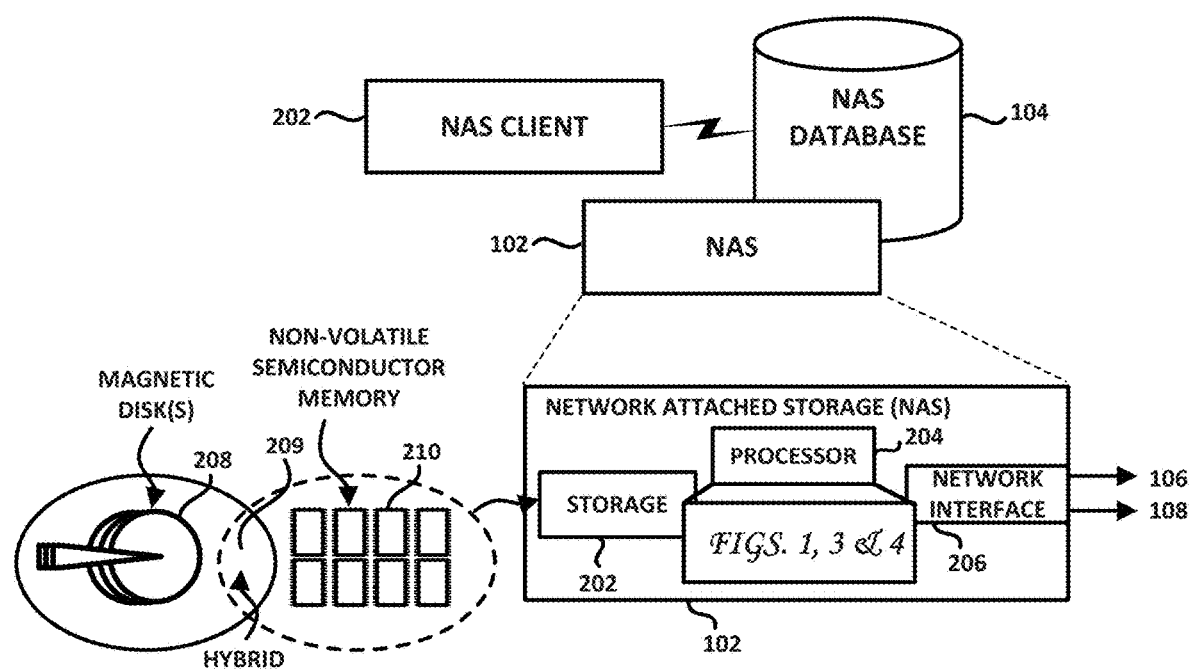
FIG. 2 is a block diagram showing further aspects of one embodiment.

FIG. 2 is a block diagram showing further aspects of one embodiment. In one embodiment, the device 102 may be or comprise a NAS. The device 102, whether configured as a NAS or differently, may comprise storage 202. The storage 202 may comprise one or more hard disk drives (HDDs) 208, each comprising one or more spinning magnetic disks. The storage 202 may alternatively comprise non-volatile (e.g., Flash-based) memories 210. Alternatively still, the storage 202 may comprise one or more hybrid storage devices, each comprising both magnetic disks 208 and non-volatile semiconductor memory 210, as suggested at reference numeral 209. The device 202 may also comprise one or more network interfaces 206, enabling the device 202 to communicate with the networks 106, 108 and/or other external devices through communication ports. As also shown in FIG. 2, the device 202 may also comprise a processor 204 coupled to both the storage 202 and to the network interface 206. The processor 204 may be configured to execute instructions configured to implement the functionality described and shown in this disclosure. As noted earlier, the database 104 may be stored within the NAS 202 or externally thereto and accessible through networks 106 and/or 108.

Figure 3:
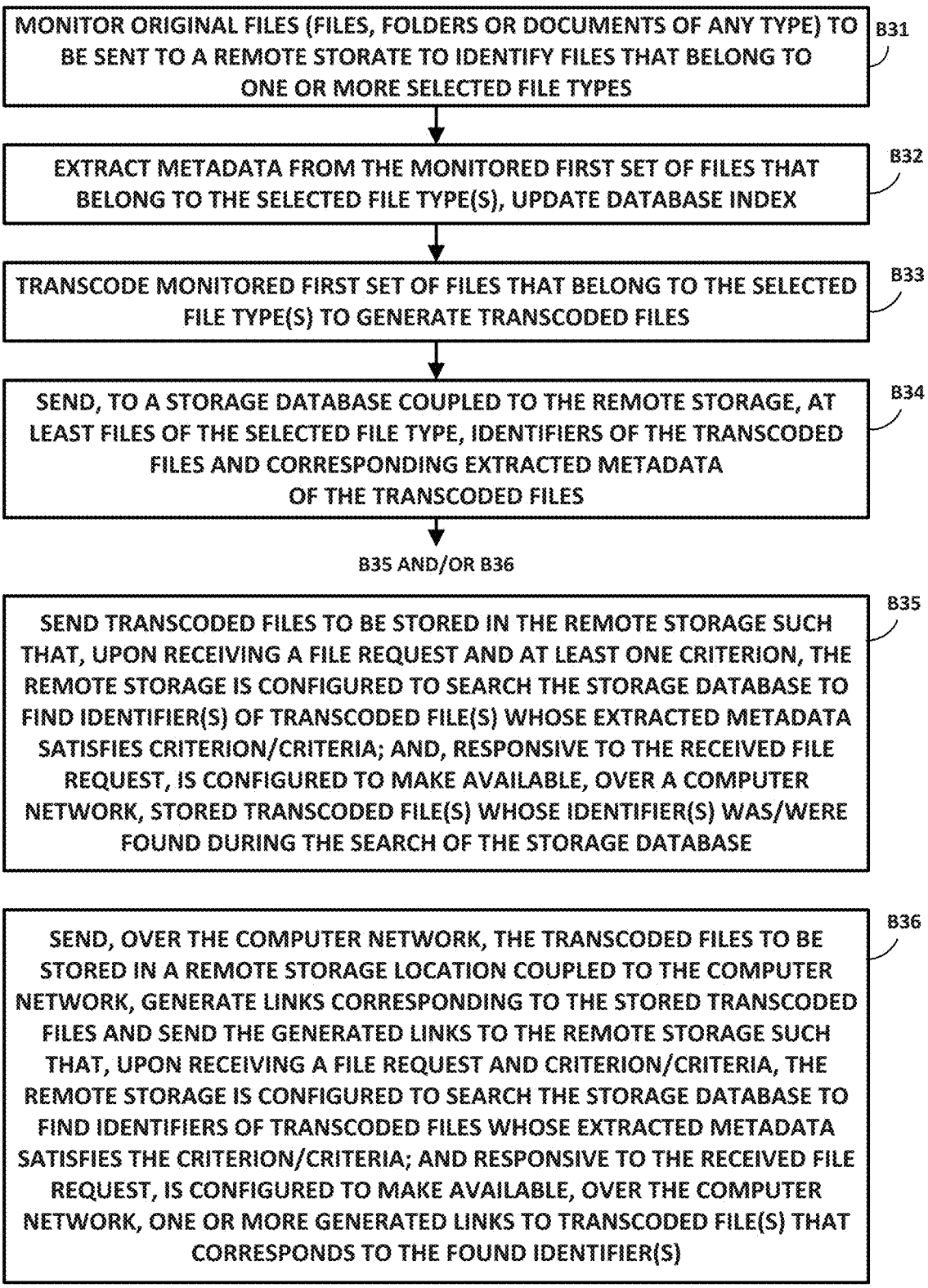
FIG. 3 is a flowchart of a method according to one embodiment.

FIG. 3 is a flowchart of a method according to one embodiment. As shown therein, a method according to one embodiment may begin at B31, in which original files (e.g., files in their native format and size) or folders to be sent to a remote storage such as NAS 102 may be monitored to identify files that belong to one or more selected file types. The terms "file", whether used in its singular or plural form, is intended to encompass, within its scope, files, folders, or documents or logical computer-readable constructs of any type. For example, the monitored files may belong to predetermined categories such as, for example, video files, audio files and/or graphic or photo files. According to one embodiment, original files that do not belong to any of the monitored categories or file types may be passed through without any transcoding. Note, however, that it may be useful to nevertheless extract metadata from such original files that do not belong to any of the monitored categories or file types, and to store the extracted metadata in the NAS database 104, to thereby enable more efficient searching and/or for other purposes. As shown at B32, metadata may be extracted from the monitored original files that do belong to the selected file type(s) and the database index may be correspondingly updated. Thereafter, those monitored original files that belong to the selected file type(s) may be transcoded to generate transcoded files, as shown at B33. As shown at B34, identifiers of the transcoded files and corresponding extracted metadata of the transcoded files may be sent to a storage database coupled to the remote storage. The identifiers may comprise, for example, the file names of the transcoded file and/or other unique identifiers. The extracted metadata may be sent to and stored in the NAS database 104, along with the corresponding identifiers.

Thereafter, the method may carry out the functionality shown in block B35 and/or the functionality shown in block B36. Turning first to block B35, the transcoded files themselves may be stored in the remote storage (e.g., NAS 102). In this manner, when the NAS 102 receives a file request and at least one criterion (e.g., "still photos of Fred in Paris in 2012") from, for example, a mobile computing device coupled to WAN 108, the NAS 102 may search the storage database 104 to find one or more identifiers of one or more transcoded files whose extracted metadata satisfies the provided criterion or criteria (in this case, photo, Fred, Paris, 2012). Responsive to the received file request, the NAS 102 may be configured to make available, over a computer network such as 106, 108, one or more stored transcoded files whose identifier(s) were found during the search of the storage database 104. As shown in FIG. 1, such providing of transcoded files may be carried out via a push model, a streaming process, a Really Simple Syndication (RSS) feed, a messaging-based model such as a Publish-Subscribe process and/or any other method to enable a remote device such as shown at 120, 122, 124 and 126 to access and render the transcoded file or files.

Alternatively or in addition, block B36 may be carried out after block B34. As shown, B34 calls for sending, over the computer network 106, 108, the transcoded files generated by the client computing device to a remote storage location (such as cloud storage or services 128, 130) coupled to the computer network 106, 108, for storage therein. The remote storage location may thereafter generate and return links corresponding or pointing to the stored transcoded files in the remote storage 128, 130. Such links may then be stored in the NAS 102, together with the extracted metadata and file identifiers. Thereafter, responsive to receiving a file request and one or more criterion, the NAS 102 may send not the transcoded files themselves, but the generated link or links, pointing to some location(s) in a remote storage location such as cloud storage or services 128, 130. Indeed, upon receiving a file request and one or more criterion, the NAS 102 may search the storage database 104 to find identifiers of transcoded files whose extracted metadata satisfies the criterion or criteria and may then send or otherwise make available, over the computer network 106, 108, one or more of the generated links to one or more transcoded files that correspond to the found identifier(s). In this manner, the NAS 102 may serve up links to transcoded files instead of serving up the transcoded files themselves. This reduces the computational load on the NAS 102 and offloads the duties of streaming or pushing the transcoded files to the remote storage location (the cloud storage or services 128, 130). The remote storage location (e.g., cloud storage or service 128, 130) may thereafter be maintained synchronized with the remote storage (e.g., NAS 102) such that the remote storage stores links to all transcoded files stored in the remote storage location and such that the remote storage location stores all transcoded files corresponding to links stored in the remote storage.

Blocks B31, B32, B33 and B34 may be carried out, according to one embodiment, by a computing device that is a client of and separate from, the remote storage (e.g., the NAS 102). Moreover, the sending of the transcoded files and of the extracted metadata may also be carried out by such client computing device. The functionality of the NAS 102 also shown in blocks B35 and B36 is also enabled by the acts carried out by the client computing device. The selected file type may comprise, for example, video files, audio files and still picture files. Other file types may be selected. According to one embodiment, the extracted metadata may comprise, for example, temporal metadata, geographic metadata, topical metadata, and/or other media-specific or file-type specific metadata. According to one embodiment, the transcoding carried out by the client computing device (i.e., rather than the NAS 102) may comprise, for example, converting a format of an original file from a first format to a second file format and/or converting a size of an original file from a first size to a second size. The making available of the transcoded file or files over the computer network 106, 108 of block B35 may comprise, for example, streaming, messaging an availability of, making available for download and uploading one or more transcoded files whose identifiers were found during the search of the storage database. The transcoding may comprise, for example, converting the monitored original files into a format suitable for streaming and/or converting the monitored original files into a format suitable for a mobile computing device, which may have, for example, a smaller display.

Figure 4:
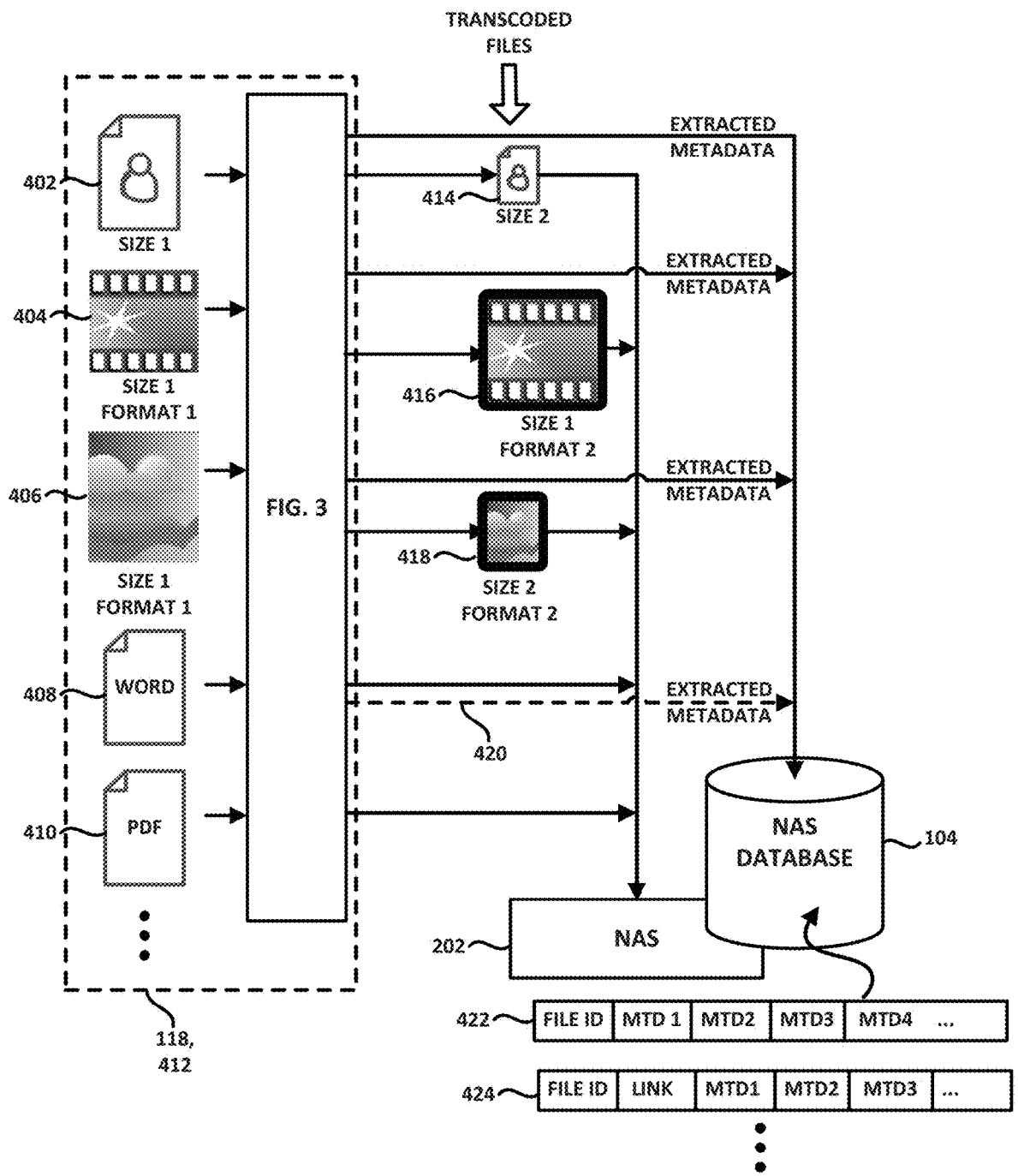
FIG. 4 is a block diagram showing still further aspects of one embodiment.

FIG. 4 is a block diagram showing still further aspects of one embodiment. As shown, the watcher 118, running on client computing device 412, may carry out and/or enable the functionality shown in FIG. 3. The client computing device 412 may be that computing device that created (or received a copy of) the original files, such as shown at 402, 404, 406, 408, 410. By carrying out the functionality described and shown relative to FIG. 3 and elsewhere, metadata may be extracted and original files may be transcoded by the client computing device, and not the NAS. The extracted metadata may be stored in the NAS database 104 and the transcoded files may be stored in the NAS 102. As shown in FIG. 4, the transcoding process may comprise most any transformation of an original file. For example, an original file may be transcoded to have a different size. The file may, for example, be transcoded to have a smaller size as shown at 414 or may be up-sampled to a greater size and resolution. For example, video taken on a mobile device may be transcoded to a larger size file for display on for example, a remote device 120, 122, 124 or 126 comprising or coupled to a large screen 4K television. Alternatively, the size of the original file may be preserved and the format thereof changed from a first format to a second format, as shown at 416. Alternatively still, the original file may be transcoded to have both a different size and a different format as shown at 418. Some files may not be transcoded at all, such as MS Word files 408 or PDF files 410. However, metadata may be extracted from original files that are not transcoded, as suggested at 420.

As shown at 422, a record of the NAS database 104 may comprise, for example, an identifier of the transcoded file (File ID) and one or more extracted metadata items (MTD1, MTD2, MTD3 . . . ), as well as the storage location of the corresponding transcoded file in the NAS 102. In the case in which the NAS 102 does not store the transcoded files themselves (i.e., block B36 in FIG. 3), a record of the NAS database 104 may comprise an identifier of the transcoded file (File ID), a link to the location, on the network 106 or 108, where the transcoded file is stored and one or more extracted metadata items (MTD1, MTD2, MTD3 . . . ).

According to one embodiment, the functionality of the watcher 118 described and shown may occur transparently to the user experience and independently of user action—the user need not do anything, as the watcher 118 operates automatically in the background when a file transfer to the NAS is requested. Therefore, no changes to the user experience need occur and the user is not burdened with the minutiae of deciding which files should be transcoded into which format or of managing metadata. The user works in the environment with which he or she is accustomed, but the transcoding and metadata extraction may be, according to one embodiment, carried out by the client computing device rather than the comparatively lower-powered NAS 102. Indeed, the watcher 118 may operate as a service that logically sits between the client computing device and the NAS 102 and intercepts files as they are requested to be transferred to the NAS 102. According to one embodiment, the transfer of original files to the NAS 102 may not be delayed, as this is an important parameter for customers. Although the transfer of original files to the NAS 102 may occur immediately or soon after the user so requests, the transcoding and metadata extraction may occur in the background, as such may not be as time urgent a task. Thereafter, the transcoded files and the extracted metadata (or a link to the transcoded file and the extracted metadata) may be provided to the NAS 102 asynchronously, through a separate API for example. The watcher 118 need only be active when a copy to NAS has been requested.

In this manner, the functionality of the watcher 118 may be discharged transparently to the user, who would see no slow-down in the speed at which his or her media is transferred to the NAS 102. Advantageously, the user sees the results of such automatic transcoding (thumbnails of images, videos, album artwork, etc.) much faster than would otherwise be the case had the NAS 102 been charged with the transcoding and metadata extraction duties. In turn, this allows the media to be searched and enjoyed much faster than would be possible otherwise, had the user had to wait for the often computationally less capable NAS 152 to complete the transcoding and metadata extraction.

The watcher 118, according to one embodiment, may be configured to monitor one or more predetermined devices for file transfers to the NAS 102, but to ignore file transfers to the NAS 102 from other devices. For example, photos taken from a 35 mm high-end camera may be monitored, while photos from the user's phone may be ignored and passed through without metadata extraction or transcoding. For example, with reference back to FIG. 1, a video camera 132 may have been designated as a device whose files are to be monitored. The video and/or photos taken by camera 132 may be stored on, for example, a Micro SD card 134. This micro SD card may be inserted into a, for example, wireless drive 136. The wireless drive 136 may then, according to one embodiment, wireless send the pictures and/or photos stored on the micro SD memory to a client device (such as shown at 110). The client device 110 may then carry out the transcoding and metadata extraction duties disclosed and shown in this document and transfer the extracted metadata and transcoded files back to the wireless drive 136 for subsequent transfer to the NAS 102 and to the NAS database 104 and/or to a site on network 108. Alternatively still, the client device 110 may send the transcoded file to the site on the network 108 and the transcoded file and the extracted data to the NAS device 102 and the NAS database 104.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method, comprising:
    monitoring, on a client computing device, transfer of files from the client computing device to a remote storage to identify files that belong to at least one selected file type;
    automatically, in response to identifying a set of files to be sent to the remote storage that belong to the at least one selected file type during the monitoring:
        extracting, on the client computing device, metadata from the identified set of files; and
        transcoding, on the client computing device, the identified set of files to generate transcoded files by at least one of:
            converting at least one file of the identified set of files from a first file format to a second file format; and
            converting a size of at least one entire file of the identified set of files from a first size to a second size;
    sending, to a datastore coupled to the remote storage, the identified set of files, at least identifiers of the transcoded files, and corresponding extracted metadata; and
    at least one of:
        sending transcoded files to be stored in the remote storage such that, upon receiving a file request and at least one criterion, the remote storage is configured to:
            search the datastore to find at least one identifier of at least one transcoded file whose extracted metadata satisfies the at least one criterion; and
            responsive to the received file request, make available, over a computer network, at least one stored transcoded file whose at least one identifier was found during the search of the datastore; and
        sending, over the computer network, the transcoded files to be stored in a remote storage location coupled to the computer network, generating links corresponding to the stored transcoded files, and sending the generated links to the remote storage such that, upon receiving a file request and at least one criterion, the remote storage is configured to:
            search the datastore to find identifiers of transcoded files whose extracted metadata satisfies the at least one criterion; and
            responsive to the received file request, make available, over the computer network, at least one generated link to at least one transcoded file that corresponds to the at least one found identifier.

2. The method of claim 1, performed by the client computing device that is a client of and separate from the remote storage.

3. The method of claim 1, wherein the remote storage comprises a Network Attached Storage (NAS).

4. The method of claim 1, wherein the at least one selected file type comprises at least one of a video file, an audio file, and a still picture file.

5. The method of claim 1, wherein the extracted metadata comprises at least one of temporal metadata, geographic metadata, topical metadata, and media-specific metadata.

6. The method of claim 1, wherein making the at least one transcoded file or the at least one generated link available over the computer network comprises at least one of:
streaming;
messaging an availability of;
making available for download; and
uploading the at least one transcoded file whose identifiers were found during the search of the datastore.

7. The method of claim 1, wherein the datastore is contained within the remote storage.

8. The method of claim 1, wherein the remote storage location comprises a cloud storage service.

9. The method of claim 1, further comprising maintaining the remote storage location synchronized with the remote storage, such that the remote storage stores links to transcoded files stored in the remote storage location and such that the remote storage location stores transcoded files corresponding to links stored in the remote storage.

10. A device, comprising:
storage;
a network interface configured to couple the device to a computer network; and
a processor connected to the storage and to the network interface, the processor being configured to:
monitor transfer of files from the device to a remote storage to identify files that belong to at least one selected file type;
automatically, in response to identifying a set of files to be sent to the remote storage that belong to the at least one selected file type during the monitoring:
extract, on the device, metadata from the identified set of files; and
transcode, on the device, the identified set of files to generate transcoded files by at least one of:
converting at least one file of the identified set of files from a first file format to a second file format; and
converting a size of at least one entire file of the identified set of files from a first size to a second size;
send, to a datastore coupled to the remote storage, the identified set of files, at least identifiers of the transcoded files, and corresponding extracted metadata; and
at least one of:
send transcoded files to be stored in the remote storage such that, upon receiving a file request and at least one criterion, the remote storage is configured to:
search the datastore to find at least one identifier of at least one transcoded file whose extracted metadata satisfies the at least one criterion; and
make available, over a computer network, at least one stored transcoded file whose at least one identifier was found during the search of the datastore; and
send, over the computer network, the transcoded files to be stored in a remote storage location coupled to the computer network, generate links corresponding to the stored transcoded files, and send the generated links to the remote storage such that, upon receiving a file request and at least one criterion, the remote storage is configured to:
search the datastore to find identifiers of transcoded files whose extracted metadata satisfies the at least one criterion; and
make available, over the computer network, at least one generated link to at least one transcoded file that corresponds to the at least one found identifier.

11. The device of claim 10, wherein the device comprises a computing device that is a client of and separate from the remote storage.

12. The device of claim 10, wherein the remote storage comprises a Network Attached Storage (NAS).

13. The device of claim 10, wherein the at least one selected file type comprises at least one of a video file, an audio file, and a still picture file.

14. The device of claim 10, wherein the extracted metadata comprises at least one of temporal metadata, geographic metadata, topical metadata, and media-specific metadata.

15. The device of claim 10, wherein the processor is further configured to make the at least one transcoded file or the at least one generated link available over the computer network by at least one of:
streaming;
messaging an availability of;
making available for download; and
uploading the at least one transcoded file whose identifiers were found during the search of the datastore.

16. The device of claim 10, wherein the datastore is contained within the remote storage.

17. The device of claim 10, wherein the remote storage location comprises a cloud storage service.

18. The device of claim 10, wherein the processor is further configured to maintain the remote storage location synchronized with the remote storage, such that the remote storage stores links to transcoded files stored in the remote storage location and such that the remote storage location stores transcoded files corresponding to links stored in the remote storage.

19. The device of claim 10, wherein the processor is further configured to transcode by converting the identified set of files into a format suitable for streaming.

20. The device of claim 10, wherein the processor is further configured to transcode by converting the identified set of files into a format suitable for a mobile computing device.

21. The method of claim 1, wherein the client computing device has comparatively higher processing power than the remote storage.

22. A device, comprising:
data storage;
a network communications means configured to couple the device to a computer network;
monitoring means for monitoring file types being transferred from the data storage to a remote storage to identify files that belong to at least one selected file type; and
a processor connected to the data storage and to the network communications means, the processor configured to:
automatically, in response to identifying a set of files to be sent to the remote storage that belong to the at least one selected file type by the monitoring means:

extract, on the device, metadata from the identified set of files; and transcode, on the device, the identified set of files to generate transcoded files by at least one of:

converting at least one file of the identified set of files from a first file format to a second file format; and converting a size of at least one entire file of the identified set of files from a first size to a second size;

send, to a datastore coupled to the remote storage, the identified set of files, at least identifiers of the transcoded files, and corresponding extracted metadata; and at least one of:

send transcoded files to be stored in the remote storage such that, upon receiving a file request and at least one criterion, the remote storage is configured to:

search the datastore to find at least one identifier of at least one transcoded file whose extracted metadata satisfies the at least one criterion; and make available, over a computer network, at least one stored transcoded file whose at least one identifier was found during the search of the datastore; and send, over the computer network, the transcoded files to be stored in a remote storage location coupled to the computer network, generate links corresponding to the stored transcoded files, and send the generated links to the remote storage such that, upon receiving a file request and at least one criterion, the remote storage is configured to:

search the datastore to find identifiers of transcoded files whose extracted metadata satisfies the at least one criterion; and make available, over the computer network, at least one generated link to at least one transcoded file that corresponds to the at least one found identifier.

23. The device of claim 22, wherein the device comprises a computing device that is a client of and separate from the remote storage.

24. The device of claim 22, wherein the device has comparatively higher processing power than the remote storage.

* * * * *